US012326600B2

(12) United States Patent
Tang et al.

(10) Patent No.: US 12,326,600 B2
(45) Date of Patent: Jun. 10, 2025

(54) ELECTRONIC MODULE AND OPTICAL DEVICE

(71) Applicant: Advanced Semiconductor Engineering, Inc., Kaohsiung (TW)

(72) Inventors: Shih-Chieh Tang, Kaohsiung (TW); Ying-Chung Chen, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 0 days.

(21) Appl. No.: 17/465,729

(22) Filed: Sep. 2, 2021

(65) Prior Publication Data

US 2023/0062337 A1 Mar. 2, 2023

(51) Int. Cl.
  *G02B 6/42* (2006.01)
(52) U.S. Cl.
  CPC ............................ *G02B 6/421* (2013.01)
(58) Field of Classification Search
  CPC ............................................ G02B 6/421
  See application file for complete search history.

(56) References Cited

U.S. PATENT DOCUMENTS

| | | | | |
|---|---|---|---|---|
| 4,269,648 A | * | 5/1981 | Dakss | G02B 6/4203 385/35 |
| 8,254,737 B2 | * | 8/2012 | Choudhury | G02B 6/305 385/28 |
| 10,451,806 B1 | * | 10/2019 | Puckett | G02F 2/02 |
| 2013/0155723 A1 | * | 6/2013 | Coleman | G02B 6/0075 362/621 |
| 2013/0198414 A1 | * | 8/2013 | Julien | G02B 6/4246 709/249 |
| 2016/0341915 A1 | * | 11/2016 | Böldicke | G02B 6/424 |
| 2018/0066809 A1 | * | 3/2018 | Vdovin | F21V 11/00 |
| 2019/0170925 A1 | * | 6/2019 | Nichol | G02B 6/0065 |
| 2021/0080637 A1 | * | 3/2021 | Brick | G02B 27/0172 |
| 2022/0325855 A1 | * | 10/2022 | Morita | G03B 21/2066 |

* cited by examiner

*Primary Examiner* — Sung H Pak
*Assistant Examiner* — Hoang Q Tran
(74) *Attorney, Agent, or Firm* — FOLEY & LARDNER LLP

(57) ABSTRACT

The present disclosure provides an electronic module includes a light source configured to radiate a first light beam having a first wavelength and a converting device configured to receive the first light beam and to convert the first light beam to a second light beam having a second wavelength different from the first wavelength. The electronic module also includes a connection element configured to transmit the first light beam from the light source to the converting device and adapted to a predetermined geometric relationship between the light source and the converting device to meet a condition of total internal reflection.

20 Claims, 14 Drawing Sheets

ELECTRONIC MODULE AND OPTICAL DEVICE

BACKGROUND

1. Technical Field

The present disclosure generally relates to an electronic module and an optical device.

2. Description of the Related Art

Silicon photonics is a technology that is being researched and developed worldwide, due to its promise of delivering high performance optical devices built using low-cost silicon chip technologies. Providing a sensor hub having optical devices integrated on a silicon base or similar material is desirable.

SUMMARY

In some arrangements, an electronic module includes a light source configured to radiate a first light beam having a first wavelength and a converting device configured to receive the first light beam and to convert the first light beam to a second light beam having a second wavelength different from the first wavelength. The electronic module also includes a connection element configured to transmit the first light beam from the light source to the converting device and adapted to a predetermined geometric relationship between the light source and the converting device to meet a condition of total internal reflection.

In some arrangements, an optical device includes an optical routing structure configured to receive a light from a first element and transmit the light to a second element and formed in a shape adapted to a predetermined geometric relationship between the first element and the second element to meet a condition of total internal reflection.

BRIEF DESCRIPTION OF THE DRAWINGS

Aspects of the present disclosure are readily understood from the following detailed description when read with the accompanying figures. It should be noted that various features may not be drawn to scale. The dimensions of the various features may be arbitrarily increased or reduced for clarity of discussion.

Common reference numerals are used throughout the drawings and the detailed description to indicate the same or similar elements. The present disclosure will be more apparent from the following detailed description taken in conjunction with the accompanying drawings.

DETAILED DESCRIPTION

Figure 1:
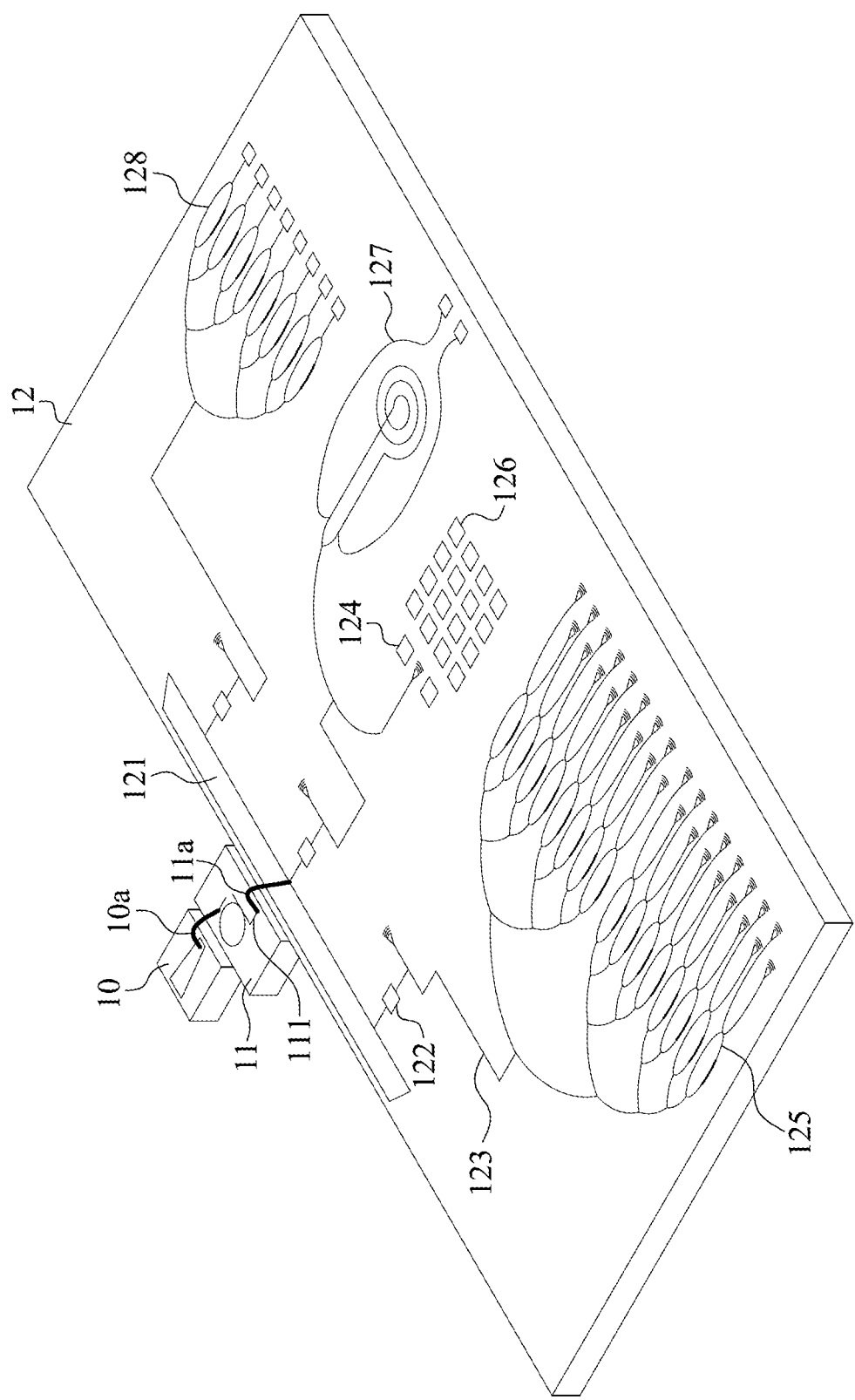
FIG. 1 illustrates a perspective view of an electronic module in accordance with some arrangements of the present disclosure.

The following disclosure provides for many different arrangements, or examples, for implementing different features of the provided subject matter. Specific examples of components and arrangements are described below. These are, of course, merely examples and are not intended to be limiting. In the present disclosure, reference to the formation of a first feature over or on a second feature in the description that follows may include arrangements in which the first and second features are formed in direct contact, and may also include arrangements in which additional features may be formed between the first and second features, such that the first and second features may not be in direct contact. In addition, the present disclosure may repeat reference numerals and/or letters in the various examples. This repetition is for simplicity and clarity and does not in itself dictate a relationship between the various arrangements and/or configurations discussed.

Arrangements of the present disclosure are discussed in detail below. It should be appreciated, however, that the present disclosure provides many applicable concepts that can be embodied in a wide variety of specific contexts. The specific arrangements discussed are merely illustrative and do not limit the scope of the disclosure.

FIG. 1 illustrates a perspective view of an electronic module 1 in accordance with some arrangements of the present disclosure. In some arrangements, the electronic module 1 may include a light source 10, a converting device 11, and a substrate 12. The substrate 12 may include a light transmitting device 121, a noise cancelling device 122, light paths 123, and sensing units 124, 125, 126, 127, and 128 fabricated in or on or disposed within or on the substrate 12.

In some arrangements, the light source 10 may include a lighting element or a lighting device that is configured to generate one or more light beams. In some arrangements, the light source 10 may be configured to generate a light beam having a plurality of different frequencies, such as a beam of visible light, white light, infrared (IR) light, ultraviolet (UV) light, and so on. In some arrangements, the light source 10 may be configured to generate a monochromatic light beam having one single wavelength. For example, the light source 10 may be configured to generate a laser beam or a light beam having a spectral linewidth of nearly zero. In that regard, in some arrangements, the light source 10 may be a laser source.

In some arrangements, the light source 10 may be physically spaced apart from the converting device 11 and the substrate 12, with a gap between the light source 10 and the converting device 11/substrate 12. For example, the light source 10 may not be in contact with the converting device 11 or the substrate 12. For example, the light source 10, the converting device 11, and the substrate 12 are discrete parts that are manufactured separately as separate components. In some arrangements, the light source 10 may be connected to the converting device 11 through a light transmitting element or a connection element 10a. In some arrangements, the connection element 10a may include a light transmitting element. In some arrangements, the connection element 10a may be configured to transmit the light beam from the light source 10 to the converting device 11. For example, the connection element 10a may be configured to provide an optical path between the light source 10 and the converting device 11. In some arrangements, the light transmitting element 10a may be formed via a three-dimensional microfabrication method. For example, laser beams may be configured to focus on a predetermined location of an optical path or a connection element in a volume of a photoresist. For example, when focused into the volume of the photoresist, the laser beams may initiate two-photon polymerization via two-photon absorption and subsequent polymerization. In that regard, the light transmitting element 10a may include the photoresist.

In some arrangements, the converting device 11 may be configured to receive a light beam from the light source 10, for example, via the light transmitting element 10a. In some arrangements, the converting device 11 may be configured to convert each light beam from the light source 10 into a different light beam. In some arrangements, the converting device 11 may be configured to modulate one or more of the frequency, amplitude, or phase of a light beam from the light source 10. For example, the converting device 11 may be configured to convert a light beam having one frequency to a light beam having another frequency. In some arrangements, the converting device 11 may be configured to change the frequency band and/or frequency range of a light beam from the light source 10. As used herein, a frequency band refers to an interval of frequencies in the frequency domain of a light beam and is defined by a lower frequency and an upper frequency. The description relating to frequencies/frequency bands is likewise applicable to wavelength. For example, the converting device 11 may be configured to change the lower frequency and/or the upper frequency of the frequency band of the light beam from the light source 10 (or from the light transmitting element 10a). In some arrangements, the converting device 11 may be configured to convert a light beam having one frequency into a light beam having a plurality of frequencies. For example, the converting device 11 may be configured to convert or split one light beam (which may have a single frequency or a frequency band) into a plurality of light beams (each may be a monochromatic light beam having a different single frequency or be a light beam having a different frequency band). In some arrangements, the converting device 11 may be configured to provide one or more light beams with which the sensing units 124, 125, 126, 127, and 128 are configured to operate. In other arrangements, the converting device 11 may output the light beam from the light source 10 without modulating the frequency, amplitude, and phase of the light beam for one or more of the sensing units 124, 125, 126, 127, and 128 configured to operate with that light beam. For example, the converting device 11 may receive a light beam from the light source 10 (or the light transmitting element 10a) and output another light beam having a wavelength substantially equal to the received light beam.

In some arrangements, the converting device 11 may include a frequency comb generator. In some arrangements, the converting device 11 may be configured to output or generate light beams having a plurality of frequencies arranged at an equal frequency interval (i.e., frequency comb). In some arrangements, the converting device 11 may be configured to output or generate a broadband optical radiation composed of equally spaced laser beams.

In some arrangements, the converting device 11 may include a micro resonator for effectuating nonlinear wave mixing to produce the frequencies for the frequency comb. In some arrangements, the micro resonator may include a micro resonator based on silicon (Si), fused silica ($SiO_2$), silicon nitride ($Si_3N_4$), silicon carbide (SiC), hydrogenated amorphous silicon (a-Si:H), aluminum nitride (AlN), sapphire ($Al_2O_3$), germanium (Ge), gallium arsenide (GaAs), indium phosphide (InP) niobate ($LiNbO_3$), lithium tantalate ($LiTaO_3$), zinc oxide (ZnO), glass (such as high index glass, fluoride glass, telluride glass, chalcogenide glass), quartz, diamond, and so on. In some arrangements, the converting device 11 may further include one or more optical devices (such as a gain medium, a waveguide, a filter, a collimator, a coupler, and so on) connected with the micro resonator. The optical devices and the micro resonator of the converting device 11 may be connected through one or more light paths 111. The light paths 111 may be light paths such as but not limited to the light paths 123 on the substrate 12 as described below.

In some arrangements, the converting device 11 may be fabricated using standard, complementary-metal-oxide-semiconductor (CMOS) compatible processes and materials. For example, the micro resonator may be made of silicon nitride ($Si_3N_4$) and may be monolithically integrated, and compatible with existing silicon fabrication technology compatible with CMOS-processing.

In some arrangements, the converting device 11 may be physically spaced apart from the substrate 12 with a gap therebetween. For example, the converting device 11 may not be in contact with the substrate 12. In some arrangements, the converting device 11 may be connected to the substrate 12 through a light transmitting element or a connection element 11a. In some arrangements, the connection element 11a may include an optical routing structure. In some arrangements, the connection element 11a may be configured to transmit the light beam from the converting device 11 to the substrate 12. For example, the connection element 11a may be configured to provide an optical path between the converting device 11 and the substrate 12. For example, the light transmitting element 11a may be configured to provide an optical path between the converting device 11 and the light transmitting device 121.

In some arrangements, the substrate 12 may include a silicon photonics substrate or a material platform from which optical devices and/or photonic integrated circuits can be made. In some arrangements, the substrate 12 may include a substrate having a silicon material. In some arrangements, the substrate 12 may include a Silicon on Insulator (SOI) substrate including a silicon substrate, an oxide layer disposed on the silicon substrate, and a silicon layer disposed on the oxide layer. In some arrangements, the substrate 12 may be a light distributing device configured to direct light beams among the light transmitting device 121, the noise cancelling devices 122, and the sensing units 124, 125, 126, 127, and 128. In some arrangements, one or more of the light transmitting device 121, the noise cancelling device 122, the light paths 123, and the sensing units 124, 125, 126, 127, 128 may be fabricated in the silicon layer of the substrate 12. For example, the substrate 12 may include a silicon base (or a silicon substrate) and a silicon oxide layer disposed on the silicon base. The substrate 12 may further include a waveguide in the silicon oxide layer. In some arrangements, the waveguide may include a patterned layer, such as a patterned silicon layer. In some arrangements, the waveguide may include or is operatively coupled or connected to a part of the light transmitting device 121. For example, a part of the light transmitting device 121 may be a patterned silicon layer in the silicon oxide layer over the silicon base. The substrate 12 may further include a silicon oxide layer disposed on the silicon oxide layer to cover the light transmitting device 121.

In some arrangements, the light transmitting device 121 may be configured to receive a light beam from the converting device 11, e.g., via light transmitting element 11a. In some arrangements, the light transmitting device 121 may be configured to transmit or direct one or more light beams received toward a corresponding sensing unit among the sensing units 124, 125, 126, 127, and 128. For example, the light transmitting device 121 may be configured to transmit or direct one or more light beams having different frequencies or different frequency bands toward different sensing units. For example, the light transmitting device 121 may be configured to transmit or direct one or more light beams to different light paths leading to different sensing units based on the frequencies or frequency bands of the one or more light beams. For example, the light transmitting device 121 may be configured to filter out at least one light beam (each having a wavelength different from a wavelength of interest) from light beams having different wavelengths, such that at least one light beam having the wavelength of interest remains and is transmitted or directed to one or more corresponding ones of the sensing units 124, 125, 126, 127, and 128. For example, the light transmitting device 121 may be configured to filter out at least one light beam (each having a wavelength band different from a wavelength of interest) from light beams having different wavelength bands, such that at least one light beam having the wavelength band of interest remains and is transmitted or directed to one or more corresponding ones of the sensing units 124, 125, 126, 127, and 128. For example, the light transmitting device 121 may be configured to select at least a light beam having a wavelength to pass a light path leading to a sensing unit that can be operated with the light beam having the wavelength. For example, the light transmitting device 121 may be configured to select at least a light beam having a wavelength band to pass a light path leading to a sensing unit that can be operated with the light beam having the wavelength band.

In some arrangements, the light transmitting device 121 may include a demultiplexer (DMUX), such as a DMUX of an arrayed waveguide grating (AWG) type. In some arrangements, the light beam from the converting device 11 may be received through the light transmitting element 11a and demultiplexed by the light transmitting device 121.

In some arrangements, the noise cancelling device 122 may be connected between the light transmitting device 121 and each of the at least one of the sensing units 124, 125, 126, 127, and 128. For example, the noise cancelling device 122 may be interposed in the light paths toward each of the sensing units 124, 125, 126, 127, and 128. In some arrangements, the noise cancelling device 122 may include a micro ring structure. In some arrangements, the noise cancelling device 122 may include a micro ring resonator. In some arrangements, the noise cancelling device 122 may be configured to reduce the noise of the light beam outputted from the light transmitting device 121. In some arrangements, the noise cancelling device 122 may be configured to interfere with the light beam constructively. For example, the noise cancelling device 122 may be configured to increase the intensity of the light beam outputted from the light transmitting device 121. In some arrangements, two or more different kinds of noise cancelling device 122 may be located in the light paths moving toward different kinds of sensing units 124, 125, 126, 127, and 128. For example, the noise cancelling device 122 between the light transmitting device 121 and the sensing unit 124 may be different from the noise cancelling device 122 between the light transmitting device 121 and the sensing unit 125 with respect to size, number, resonant wavelength(s), and so on.

In some arrangements, the light paths 123 may be configured to direct light beams among two or more of the light transmitting device 121, the noise cancelling device 122, and the sensing units 124, 125, 126, 127, and 128. In some arrangements, the light paths 123 may be configured to direct light beams between the connection element 11a and the light transmitting device 121. In some arrangements, the light paths 123 and the substrate 12 may be made from or include different materials. In some arrangements, the light paths 123 and the substrate 12 may have different refractivities or refractive indices. In some arrangements, the light paths 123 may include compound semiconductors, such as III-V materials. In some arrangements, the light paths 123 may be formed by modifying the refractive index of silicon. Methods of modifying the refractive index of silicon may include current injection or local heating.

In some arrangements, each of the sensing units 124, 125, 126, 127, and 128 may include an optical sensing device (or a light sensing device), a light emitting device, or a combination thereof. In some arrangements, each of the sensing units 124, 125, 126, 127, and 128 may include one or more of an optical fiber sensor, a laser-based sensor, an optical chemical and biological sensor, a nanophotonic and plasmonic biosensor, a sensor for terahertz sensing, a sensor for quantum sensing, another type of optical sensor, or so on. For example, the sensing unit 124 may include an optical microphone, the sensing unit 125 may include a light detection and ranging (LiDAR), the sensing unit 126 may include a plasmonic filter (or a spectrometer), the sensing unit 127 may include a Sagnac interferometer, and the sensing unit 128 may include a Peptide (or an e-nose).

In some arrangements, the substrate 12 may include other optical devices fabricated on or in the silicon layer that generate, guide, manipulate, and/or detect light beams. Examples of optical devices may include lasers, optical modulators, photodetectors, optical switches, optical waveguides, and so on. In some arrangements, electronic devices may be fabricated in the silicon layer, along with the optical devices. Examples of electronic devices may include transistors, capacitors, resistors, and inductors. However, it should be noted that the silicon layer may include only optical devices or may include both electronic devices and optical devices.

The sensing units in FIG. 1 is for illustrative purposes only, and the number or the type of the sensing units is not limited thereto. In some arrangements, there may be any number or any type of sensing units in the electronic module 1 depending on design requirements.

In some arrangements, two or more of the sensing units 124, 125, 126, 127, and 128 may be configured to receive light beams having different frequencies or frequency bands. For example, the sensing unit 124 is configured to receive or detect light beams of a wavelength band, and the sensing unit 125 is configured to receive or detect light beams of another wavelength band. For example, the sensing unit 124 is configured to operate with light beams of a wavelength band, and the sensing unit 125 is configured to operate with light beams of another wavelength band. In some arrangements, two or more of the sensing units 124, 125, 126, 127, and 128 may be configured to radiate light beams having different frequencies or frequency bands. For example, the sensing unit 124 is configured to radiate light beams of a wavelength band, and the sensing unit 125 is configured to radiate light beams of another wavelength band. In some arrangements, a first sensing unit on the substrate 12 may be configured to radiate light beams and a second sensing unit on the substrate 12 may be configured to receive a reflecting light of the light beams (radiated by the first sensing unit) as reflected by an object outside of the electronic module 1. In some arrangements, the electronic module 1 may further includes a light receiving device outside of the electronic module 1 (e.g., outside of the substrate 12) and configured to receive light beams radiated by a sensing unit on the substrate 12.

In some arrangements, the electronic module 1 may be a sensor hub that has a plurality of sensing units (such as the sensing units 124, 125, 126, 127, and 128) integrated or disposed on or within the same substrate or carrier. In some arrangements, the sensing units may be integrated onto a silicon base or similar material. The packaging size is reduced at least by an order of magnitude while matching the performance of a system built with discrete components.

In some arrangements, although the plurality of sensing units are configured to operate with light beams having different frequencies or frequency ranges, the sensing units in the electronic module 1 may share the same light source 10. For example, given that the light beams can be converted by the converting device 11 and demultiplexed by the light transmitting device 121 to a corresponding sensing unit, the sensing units in the electronic module 1 may share the same light source 10 and the feasible bandwidth can be increased. In addition, by using the light paths 123, costs are minimized because additional optical fibers do not need to be deployed, which is usually quite costly.

Figure 2A:
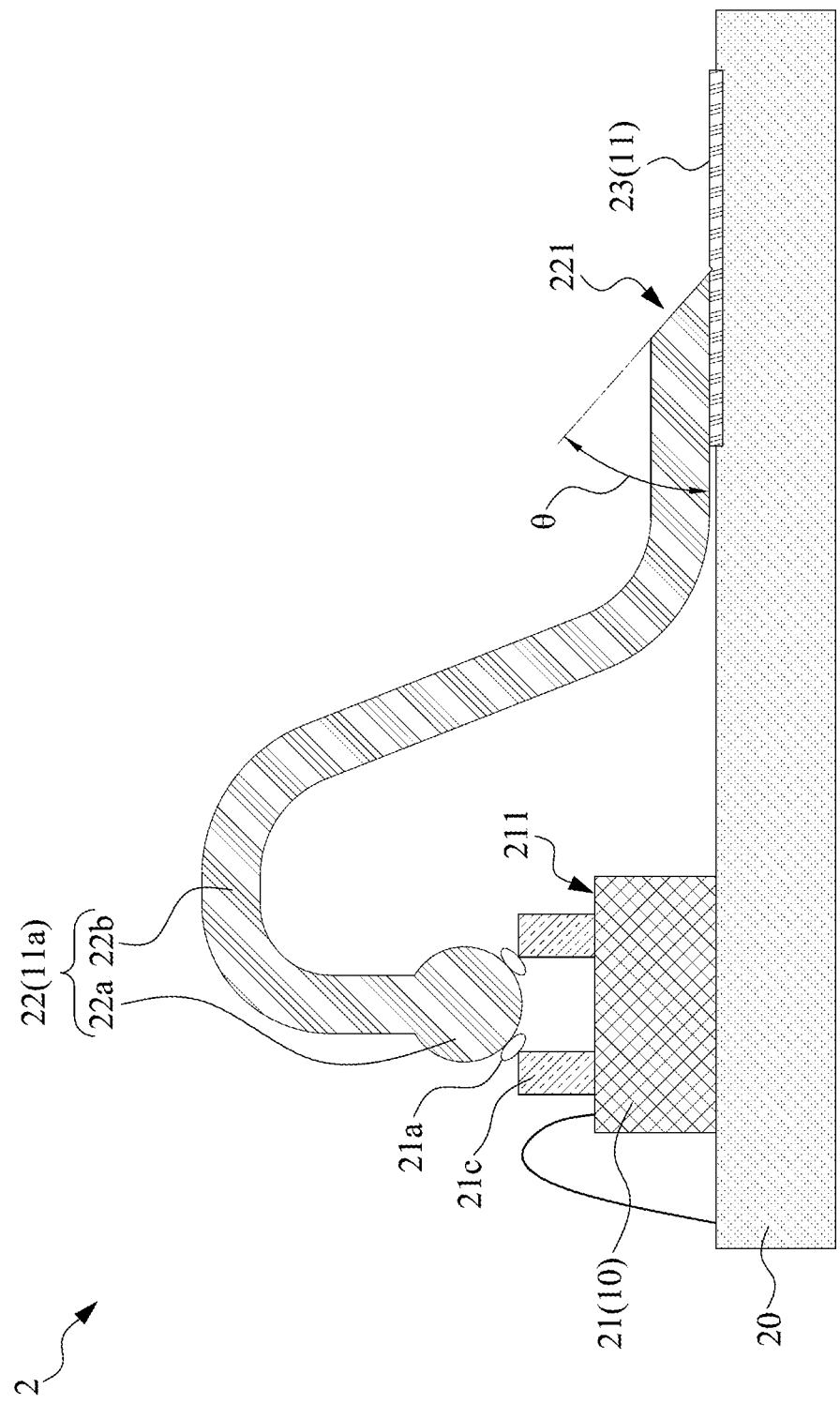
FIG. 2A illustrates a side view of an electronic module in accordance with some arrangements of the present disclosure.

FIG. 2A illustrates a side view of an electronic module 2 in accordance with some arrangements of the present disclosure. In some arrangements, a part of the electronic module 1 in FIG. 1 may include the electronic module 2 of FIG. 2A. The electronic module 2 includes at least a substrate 20, electric components 21 and 23, and a connection element 22.

The electronic components 21 and 23 may be disposed on or otherwise operatively coupled to the substrate 20 and may be connected to one another via a connection element 22. In some arrangements, the connection element 22 may be the connection element 10a or the connection element 11a in FIG. 1. In some arrangements, the electronic component 21 may be the light source 10, and the electronic component 23 may be the converting device 11 that is connected to the light source 10 via the connection element 10a. In some arrangements, the electronic component 21 may be the converting device 11, and the electronic component 23 may be one of the components (such as the light transmitting device 121) on the substrate 12, where the one of the components on the substrate 12 is connected to the converting device 11 via the connection element 11a.

In some arrangements, the electronic components 21 and 23 may be disposed on a single substrate 20 as shown. In other arrangements, the electronic components 21 and 23 may be disposed on separate substrates that are physically spaced apart with a gap therebetween. For example, the substrate on which the electronic component 21 is disposed may not be in contact (e.g., direct contact) with the substrate on which the converting device 11 is disposed. For example, the substrate on which the electronic component 21 is disposed and the substrate on which the converting device 11 is disposed may be discrete parts manufactured separately.

In some arrangements, the connection element 22 may include an optical fiber. In some arrangements, the connection element 22 may include a core made of polymer (such as polymethyl methacrylate (PMMA), polycarbonate)), silica or quartz, and a cladding made of fluoropolymer or fluorinated polymer. The cladding material surrounds the core material. The cladding material may have a refractive index lower than that of the core material. In some arrangements, light may travel through the core, hit a boundary between the core and the cladding, and bounce back-and-forth off between the core and cladding at the boundary thereof. In that regard, light may be confined in the connection element 22 through total internal reflection. In some arrangements, the connection element 22 may include an optical structure 22a and a trace part 22b connected with the optical structure 22a.

In some arrangements, the optical structure 22a may have a partial-ball shape or include a partial-ball structure. An example of the optical structure 22a is a ball lens. The optical structure 22a may be coupled or attached to a contact 21c on an active surface 211 of the electronic component 21 through an adhesive structure 21a. In some arrangements, the optical structure 22a may be in contact with the contact 21c via the adhesive structure 21a, or alternatively in arrangements not shown, the optical structure 22a may be in direct contact with the contact 21c. In some arrangements, the optical structure 22a may be in direct contact with the adhesive structure 21a as shown. In some arrangements, the optical structure 22a may be thicker in width or diameter than a width or diameter of the trace part 22b so as to capture at least some of the light beams radiating from the electronic component 21. As used herein, width refers to a dimension (e.g., the largest dimension) of a cross-section taken perpendicular to the direction in which the optical structure 22a or the trace part 22b extends, e.g., from the electronic component 21 to the electronic component 23. In some other arrangements, the optical structure 22a may be omitted and the trace part 22b may be coupled or attached to the contact 21c via the adhesive structure 21a. For example, the light beams from the electronic component 21 may be captured by the trace part 22b.

In some arrangements, the trace part 22b may include a wire structure or a wire loop. In some arrangements, the trace part 22b may be extended from the optical structure 22a. In some arrangements, the trace part 22b may have one or more curved portions. In some arrangements, the trace part 22b may have one or more straight portions. In some arrangements, the trace part 22b may have a substantially uniformed width or diameter as shown. For example, the cross-section width of the trace part 22b may be consistent or unvarying throughout its entire length or a substantial portion (e.g., over 90% of the entire length). For example, the cross-section area of the trace part 22b may be consistent or unvarying throughout its entire length or a substantial portion (e.g., over 90%) of the entire length. In other arrangements, the trace part 22b may have various widths or diameters. For example, the trace part 22b may have a thinner section (with a lesser width or diameter) connected with a thicker section (with a greater width or diameter). In some arrangements, the trace part 22b may have various heights with respect to the active surface 211 of the electronic component 21. As used herein, a height with respect to the active surface 211 refers to a dimension along or parallel to a direction normal to the active surface 211. For example, the trace part 22b may have a proximal section closer to the active surface 211 of the electronic component 21 and a distal section farther from the active surface 211 of the electronic component 21. In some arrangements, the trace part 22b may have various heights with respect to an active surface of the electronic component 23. As used herein, a height with respect to the active surface of the electronic component 23 refers to a dimension along or parallel to a direction normal to the active surface of the electronic component 23. In some arrangements, the trace part 22b may have various heights with respect to the substrate 20. As used herein, a height with respect to the active surface of the substrate 20 refers to a dimension along or parallel to a direction normal to the active surface of the substrate 20.

In some arrangements, the trace part 22b may have a proximal end adjacent to the optical structure 22a and a distal end opposite to the proximal end. In some arrangements, the proximal end of the trace part 22b may be coupled or attached to the optical structure 22a. In some arrangements, the distal end of the trace part 22b may be coupled or attached to the active surface of the electronic component 23. In some arrangements, an adhesive structure (not illustrated in the figures) may be disposed between the distal end of the trace part 22b and the active surface of the electronic component 23. In some arrangements, the distal end of the trace part 22b may have a surface 221. In some arrangements, the surface 221 may be substantially planar. In some arrangements, the surface 221 and the active surface of the electronic component 23 may be oblique with respect to each other and may define an angle θ less than 90 degrees to facilitate the coupling of light beams between the trace part 22b and the electronic component 23. In some arrangements, the surface 221 may be configured to collimate light beams between the trace part 22b and the electronic component 23. For example, the surface 221 may be configured to reflect the light beams into a direction substantially perpendicular to the active surface of the electronic component 23, by virtue of the angle θ.

In some arrangements, the adhesive structure 21a may include a photoresist. In some arrangements, the adhesive structure 21a may include a light curable material, such as a UV glue, a polymerizable composition containing photoinitiators, or so on. In some arrangements, the adhesive structure 21a may have a refractive index lower than that of the core material of the connection element 22. In some arrangements, the adhesive structure 21a may surround the contact 21c on the active surface 211 of the electronic component 21. In some arrangements, the adhesive structure 21a may cover the contact 21c on the active surface 211 of the electronic component 21. In some arrangements, the adhesive structure disposed between the distal end of the trace part 22b and the active surface of the electronic component 23 may be a structure such as but not limited to the adhesive structure 21a.

Figure 2B:
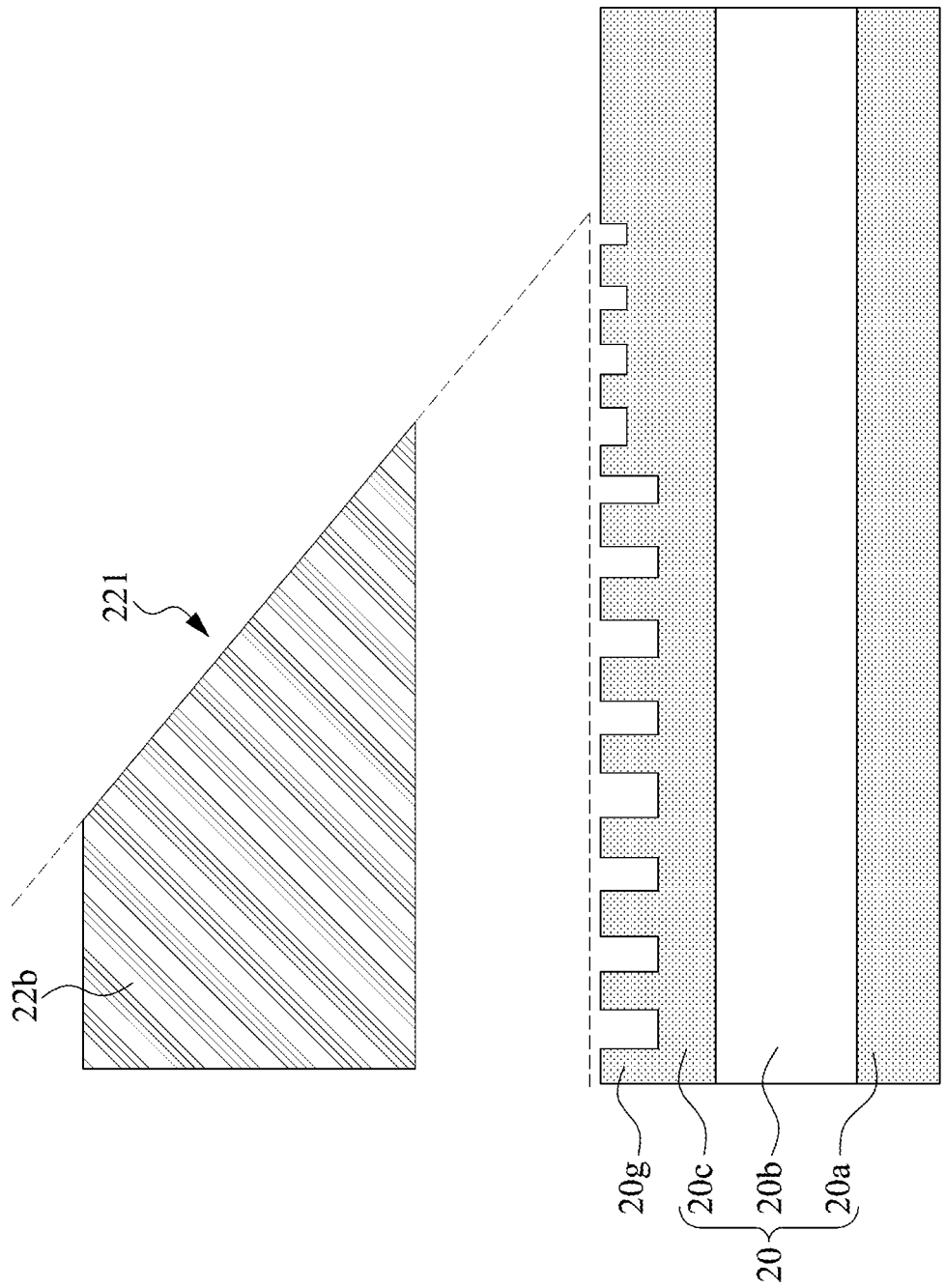
FIG. 2B illustrates an enlarged view of an electronic module in accordance with some arrangements of the present disclosure.

FIG. 2B illustrates an enlarged view of an electronic module in accordance with some arrangements of the present disclosure. In some arrangements, the electronic module 2 in FIG. 2B may have an enlarged view of a portion of FIG. 2A. The same or similar components are annotated with the same symbols.

As shown in FIG. 2B, the substrate 20 may include an SOI substrate including a silicon substrate 20a, an oxide layer 20b disposed on the silicon substrate 20a, and a silicon layer 20c disposed on the oxide layer 20b. In some arrangements, a waveguide structure may be formed in the silicon layer 20c. In some arrangements, the waveguide structure may include a grating or a diffraction grating as shown. For example, a grating 20g may be formed in the silicon layer 20c. In some arrangements, the grating 20g may include recesses having different depths as shown. In some arrangements, the grating may include extending parts having different heights. As used herein, a height of the grating 20g refers to a dimension of the grating along or parallel to a direction normal to the lower surface of the silicon layer 20c contacting the oxide layer 20b. In some arrangements, the waveguide structure may be configured to facilitate the coupling of light beams between the trace part 22b and the electronic component 23. In some arrangements, the surface 221 may be configured to reflect the light beams into the grating 20g formed in the silicon layer 20c. In some arrangements, the waveguide structure and the surface 221 may be configured to collimate the light beams.

In some arrangements, manufacturing the electronic module 2 as illustrated in FIG. 2A includes providing (e.g., manufacturing or forming) the electronic component 21 and the electronic component 23. The electronic component 21 and the electronic component 23 may be disposed on the same substrate 20 or disposed on separate substrates which are physically separated. Then, the connection element 22 may be formed to connect the electronic component 21 and the electronic component 23.

In some arrangements, the connection element 22 may be formed by providing a core material and cutting the core material by a diamond blade into an optical fiber. One end of the optical fiber may be shaped into the optical structure 22a that has a ball structure. In some arrangements, the optical structure 22a may be shaped by an electric arc.

Then, the optical structure 22a may be disposed on the active surface 211 of the electronic component 21 to be coupled or attached to the contact 21c. For example, the optical structure 22a may be spaced apart from the active surface 211 of the electronic component 21 by the contact 21c. The distance and the relative direction between the optical structure 22a and the active surface 211 should be well-controlled to meet a threshold/criterion of light input or luminous flux captured into the optical structure 22a. Furthermore, the distance and the relative direction between the trace part 22b and the surroundings (e.g., the active surface 211, the optical structure 22a, the electronic component 23, and the substrate 20) should be well-controlled to meet a condition of total internal reflection and trap or confine light beams in the trace part 22b. For example, the height of the trace part 22b from the substrate 20 should be kept at a certain elevation. The condition of total internal reflection is also related to the refractive index of the connection element 22 and the refractive index of cladding (or air) of the connection element 22. In some arrangements, the adhesive structure 21a may be disposed on the contact 21c before disposing the optical structure 22a, and then the optical structure 22a is provided to contact the adhesive structure 21a and the contact 21c. The adhesive structure 21a, the contact 21c, and the electronic component 21 may shift or rotate during pick-and-place processes, which may deteriorate the light input or luminous flux captured into the optical structure 22a. To address such concerns, in the present disclosure, the distance and the relative direction between the optical structure 22a and the active surface 211 may be predetermined by a simulation.

Then, the optical structure 22a and the trace part 22b may be adaptively routed to meet a threshold/criterion of light input or luminous flux captured into the optical structure 22a.

The trace part 22b may be formed by extending the trace part 22b from the optical structure 22a toward the electronic component 23. The trace part 22b may be laid down to contact the electronic component 23 (or the waveguide structure in FIG. 2B). The trace part 22b may be fixed by an adhesive structure and then cut by a diamond blade to form the angle θ.

For example, a geometric relationship (such as the distance and the relative direction) between the optical structure 22a and the active surface 211 may be calculated and predetermined, such as through a computer simulation (e.g., a Finite Element Method (FEM) simulation). Then, the connection element 22 may be adapted to the geometric relationship. For example, the shape, the widths (diameters), and the heights of the connection element 22 may be adapted to the geometric relationship. For example, the widths and the heights of the connection element 22 may be designed or adjusted according to the geometric relationship. For example, the connection element 22 may have an adaptive auto-routed portion formed based on the geometric relationship that is calculated.

In some arrangements, the geometric relationship may include a distance, a relative elevation, a difference of respective locations, or difference of respective directions between the electronic component 21 and the electronic component 23 (taking into account the nuances of the contact 21c, the adhesive structure 21a, and the adhesive structure for the electronic component 23 as part of the electronic component 21 and the electronic component 23). For example, the geometric relationship may include the difference between the location of the electronic component 21 on the substrate 20 and the location of the electronic component 23 on the substrate 20. For example, the geometric relationship may include the distance between the electronic component 21 and the electronic component 23. For example, the geometric relationship may include the relative elevation between the active surface 211 of the electronic component 21 and the active surface of the electronic component 23.

In some arrangements, by adaptively routing the connection element 22, misalignment caused by the geometric relationship may be compensated for. For example, misalignment between the electronic component 21 and the electronic component 23 may be adjusted by adaptively routing the connection element 22.

In addition, the connection element 22 may be configured to satisfy connection requirements for the electronic component 21 and for the electronic component 23. For example, the connection requirements (such as bandwidth, data rate, signal loss rate, and so on) for the electronic component 21 and for the electronic component 23 may be different. The connection element 22 may have one end adapted to the connection requirements for the electronic component 21 and another end adapted to the connection requirements for the electronic component 23.

FIGS. 3A, 3B, 3C, and 3D illustrate stages of a method of manufacturing an electronic module in accordance with some arrangements of the present disclosure. In some arrangements, at least a part of the electronic module 1 in FIG. 1 and the electronic module 2 in FIG. 2A may be manufactured as described below with respect to the FIGS. 3A, 3B, 3C, and 3D.

Figure 3A:
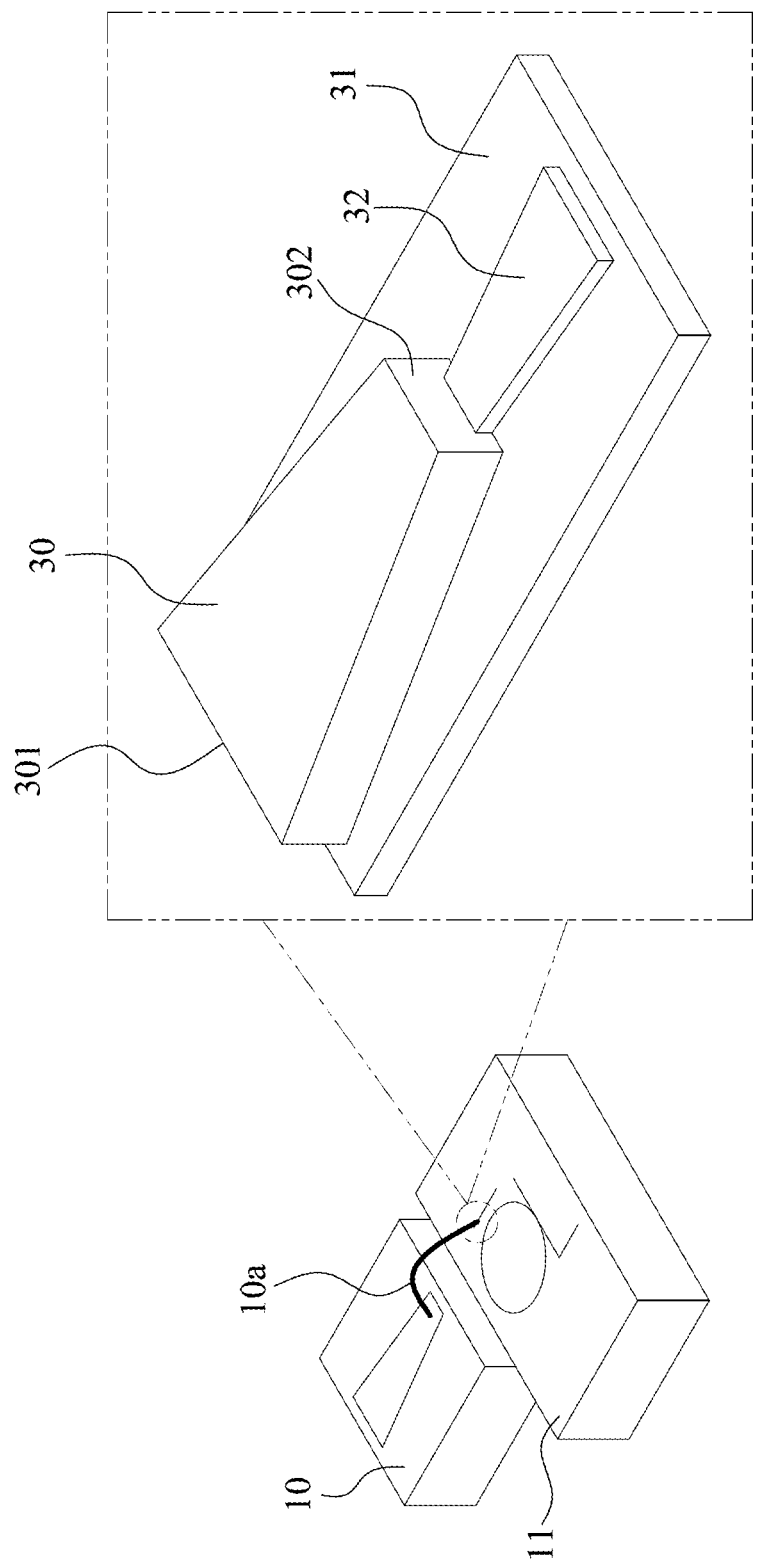
FIG. 3A illustrates one or more stages of a method of manufacturing an electronic module in accordance with some arrangements of the present disclosure.

Referring to FIG. 3A, a waveguide structure 30 may be formed on a SOI substrate including a silicon substrate (not shown in FIG. 3A), an oxide layer 31 disposed on the silicon substrate, and a silicon layer 32 disposed on the oxide layer 31. In some arrangements, the waveguide structure 30 may be formed on the converting device 11 in FIG. 1. In some arrangements, the silicon layer 32 may include an electronic component formed therein.

In some arrangements, the waveguide structure 30 may include an encapsulant, such as a polymer. In some arrangements, the waveguide structure 30 may have an end 301 configured to connect to an optical path or a connection element (e.g., the connection elements 10a and 11a in FIG. 1 or the connection element 22 in FIG. 2A) and an end 302 opposite to the end 301. In other arrangements, the end 301 of the waveguide structure 30 may be adjacent to or in contact with the light source 10 and the connection element 10a may be omitted. For example, the waveguide structure 30 may cover an end of an optical path or a connection element. For example, the waveguide structure 30 may cover a part of the light source 10. For example, a width of the end 301 of the waveguide structure 30 may be thicker than a width of an optical path or a connection element so as to capture at least some of the light beams from the light source 10. For example, a width of the end 301 of the waveguide structure 30 may be thicker than a width of an active area of the light source 10 so as to capture at least some of the light beams from the light source 10. For example, the waveguide structure 30 may cover the surface 221 of the trace part 22b in FIG. 2A. In some arrangements, the waveguide structure 30 may taper from the end 301 to the end 302. For example, the end 301 may have a dimension (such as a thickness or a width) greater than that of the end 302. In some arrangements, the waveguide structure 30 may be designed to reduce the dimension or scale difference between the light source 10 and the converting device 11. In some arrangements, the waveguide structure 30 may be configured to facilitate the coupling of light beams between a connection element and the electronic component formed in the silicon layer 32. In some arrangements, the waveguide structure 30 may be configured to facilitate the coupling of light beams between a connection element and the microring structure in the converting device 11. In some arrangements, the waveguide structure 30 may be configured to confine light beams between a connection element and the electronic component formed in the silicon layer 32 to reduce light leakage.

Figure 3B:
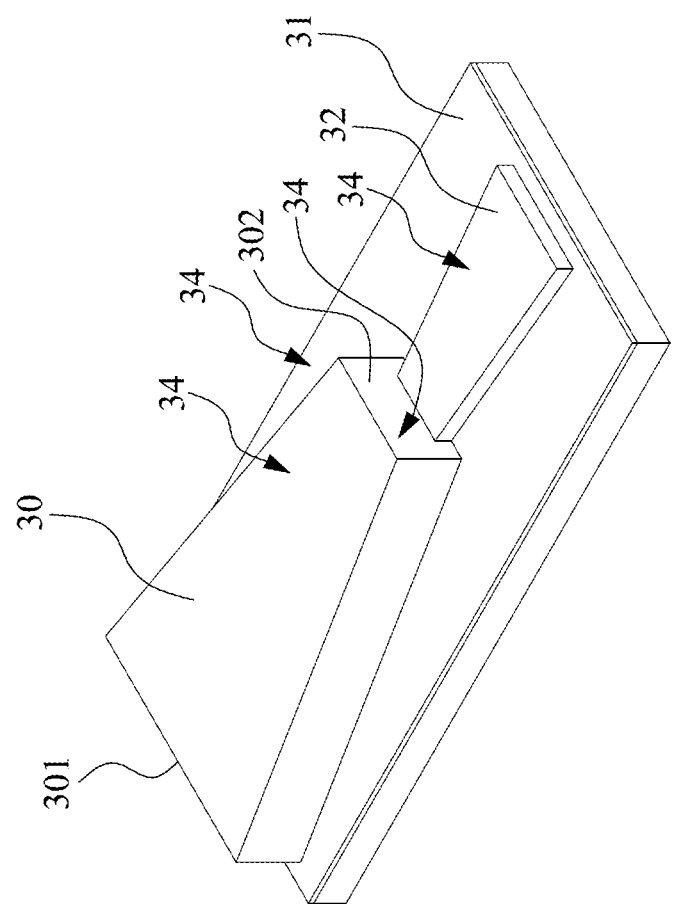
FIG. 3B illustrates one or more stages of a method of manufacturing an electronic module in accordance with some arrangements of the present disclosure.

Referring to FIG. 3B, a conductive material 34 may be formed on the waveguide structure 30. In some arrangements, the conductive material 34 may be formed by sputtering conductive material (such as metal) on the waveguide structure 30. In some arrangements, the waveguide structure 30, the end 302 of the waveguide structure 30, the oxide layer 31, and the silicon layer 32 may be at least partially covered by the conductive material 34.

Figure 3C:
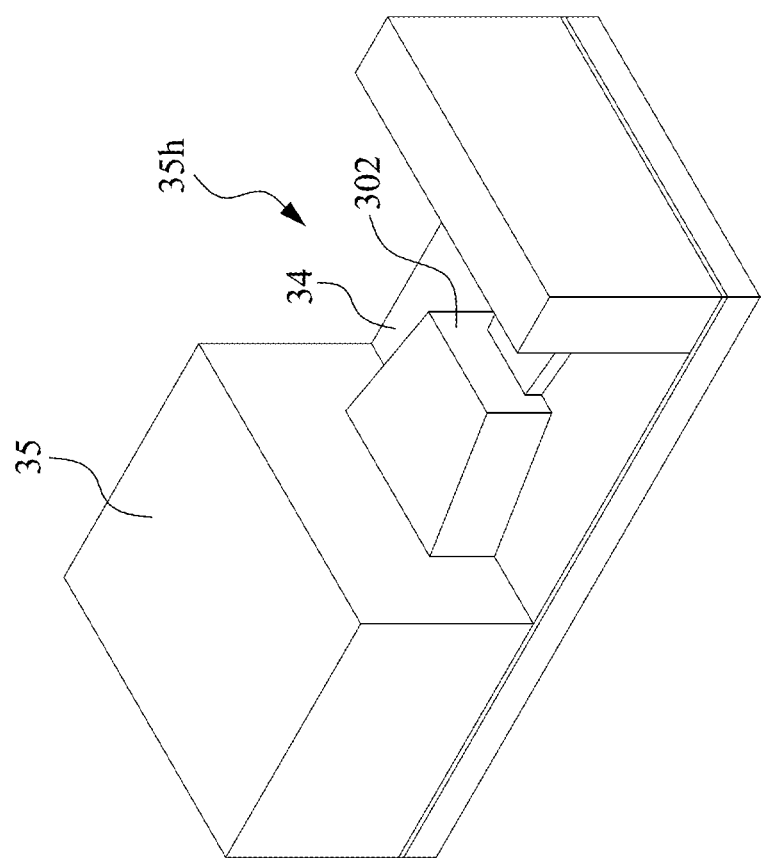
FIG. 3C illustrates one or more stages of a method of manufacturing an electronic module in accordance with some arrangements of the present disclosure.

Referring to FIG. 3C, a photoresist 35 may be disposed on the conductive material 34 and patterned to form a hole 35*h* to expose a portion of the conductive material 34. In some arrangements, the photoresist 35 may be relatively closer to the end 301 than to the end 302. For example, after the hole 35*h* is formed, the photoresist 35 may be spaced apart from the end 302. For example, after the hole 35*h* is formed, the end 302 (covered by the conductive material 34) may be exposed from the hole 35*h*.

Figure 3D:
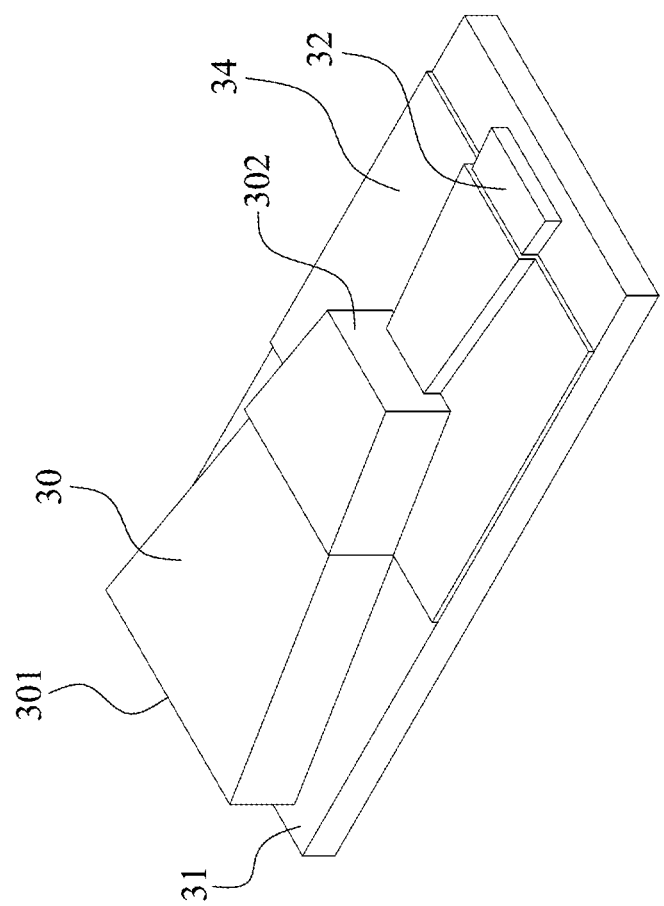
FIG. 3D illustrates one or more stages of a method of manufacturing an electronic module in accordance with some arrangements of the present disclosure.

Referring to FIG. 3D, the photoresist 35 may be removed. A part of the conductive material 34 that is exposed from the hole 35*h* shown in FIG. 3C may be left on a part of the waveguide structure 30, a part of the oxide layer 31, and a part of the silicon layer 32. For example, the conductive material 34 may cover the end 302. A part of the conductive material 34 that is covered by the photoresist 35 in FIG. 3C may be removed, i.e., etched away.

In some arrangements, the conductive material 34 may be configured to contain stray light. In some arrangements, the conductive material 34 may help to enhance the coupling efficiency between the waveguide structure 30 and the electronic component formed in the silicon layer 32.

FIGS. 4A, 4B, 4C, 4D, 4E, 4F, and 4G illustrate stages of a method of manufacturing an electronic module in accordance with some arrangements of the present disclosure. In some arrangements, a part of the electronic module 1 in FIG. 1 and the electronic module 2 in FIG. 2A may be manufactured by the operations described below with respect to the FIGS. 4A, 4B, 4C, 4D, 4E, 4F, and 4G.

Figure 4A:
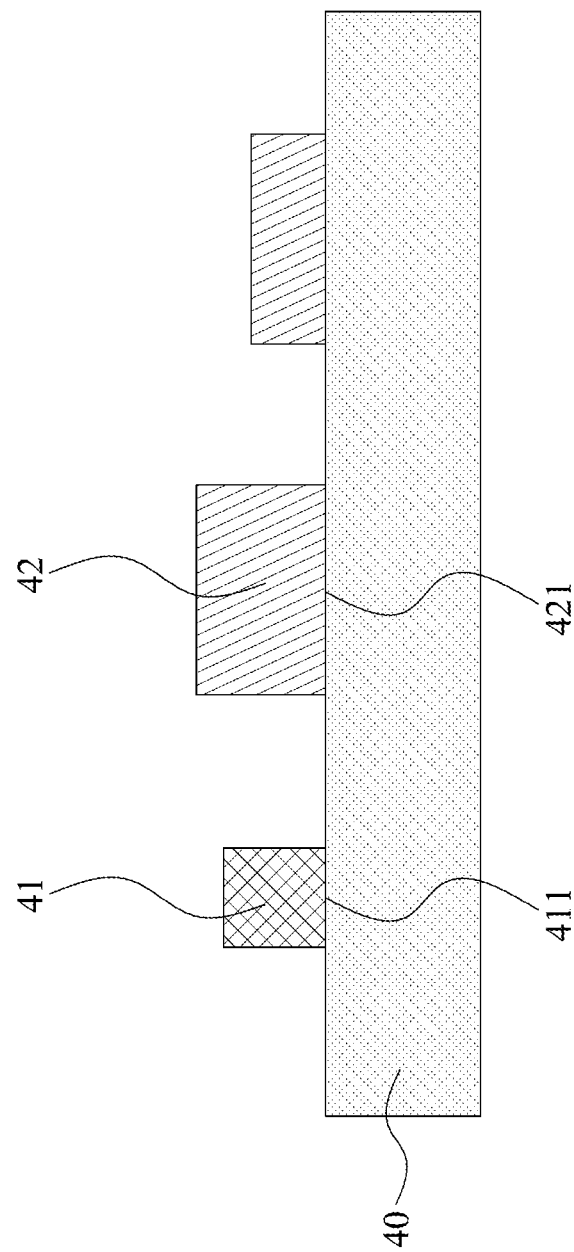
FIG. 4A illustrates one or more stages of a method of manufacturing an electronic module in accordance with some arrangements of the present disclosure.

Referring to FIG. 4A, electronic components 41 and 42 may be disposed on a carrier 40. In some arrangements, the electronic component 41 may be the light source 10, and the electronic component 42 may be the converting device 11 in FIG. 1. In some arrangements, the electronic component 41 may be the converting device 11, and electronic component 42 may be one of the components (such as the light transmitting device 121) on the substrate 12 in FIG. 1. In some arrangements, the electronic component 41 may be the electronic component 21, and the electronic component 42 may be the electronic component 23 in FIG. 2A. In some arrangements, the electronic components 41 and 42 may be disposed on a single substrate 40 as shown. In other arrangements, the electronic components 41 and 42 may be disposed on substrates that are physically spaced apart with a gap therebetween.

In some arrangements, the electronic components 41 and 42 may have different thicknesses. For example, the electronic component 42 may be thicker than the electronic component 41. As used herein, a thickness with respect to the substrate refers to a dimension along or parallel to a direction normal to a surface of the substrate 40 facing the electronic components 41 and 42. That is, the surface facing away from the carrier 40 (or the backside surface) of the electronic component 41 may be closer to the substrate 40 in comparison with the surface facing away from the carrier 40 (or the backside surface) of the electronic component 42.

The active surface 411 of the electronic component 41 may be in direct contact with the carrier 40. The active surface 421 of the electronic component 42 may be in direct contact with the carrier 40. The active surface 411 of the electronic component 41 and the active surface 421 of the electronic component 42 may be planarized or aligned. For example, the active surface 411 of the electronic component 41 may be substantially coplanar with the active surface 421 of the electronic component 42. For example, the active surface 411 of the electronic component 41 may be substantially parallel with the active surface 421 of the electronic component 42. In other arrangements, the active surface 411 of the electronic component 41 and the active surface 421 of the electronic component 42 may be non-coplanar.

Figure 4B:
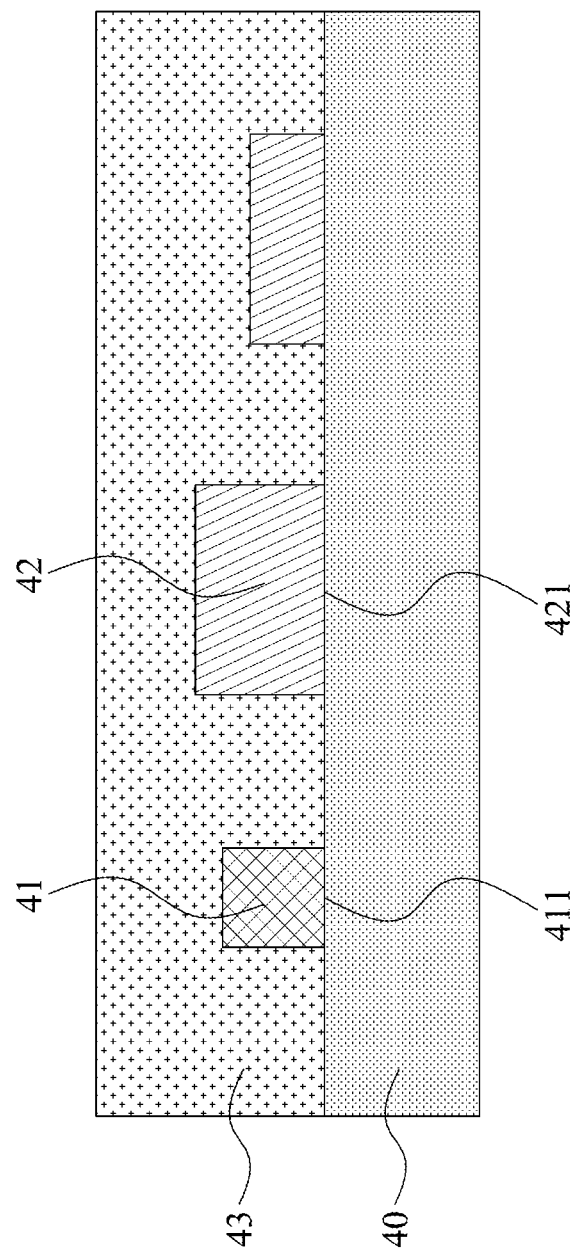
FIG. 4B illustrates one or more stages of a method of manufacturing an electronic module in accordance with some arrangements of the present disclosure.

Referring to FIG. 4B, a protection layer 43 may be disposed on the carrier 40 to cover the electronic components 41 and 42. In some arrangements, the protection layer 43 may include an epoxy resin having fillers, a molding compound (e.g., an epoxy molding compound or other molding compound), a polyimide, a phenolic compound or material, a material with a silicone dispersed therein, or a combination thereof. In some arrangements, the protection layer 43 may be formed by compression molding, transfer molding, spin casting, spray up molding, and so on.

Figure 4C:
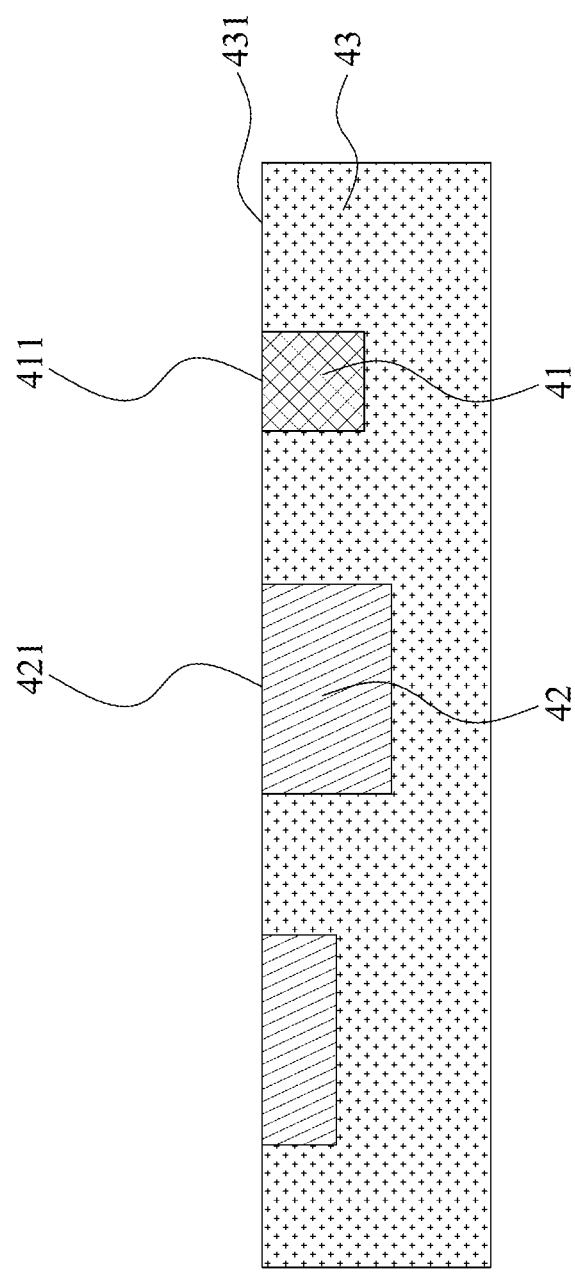
FIG. 4C illustrates one or more stages of a method of manufacturing an electronic module in accordance with some arrangements of the present disclosure.

Referring to FIG. 4C, the carrier 40 may be removed to expose the active surface 411 of the electronic component 41 and the active surface 421 of the electronic component 42. A planar surface 431 may be defined by a surface of the protection layer 43, the active surface 411 of the electronic component 41, and the active surface 421 of the electronic component 42. As shown, the surface of the protection layer 43, the active surface 411, and the active surface 421 are coplanar.

Figure 4D:
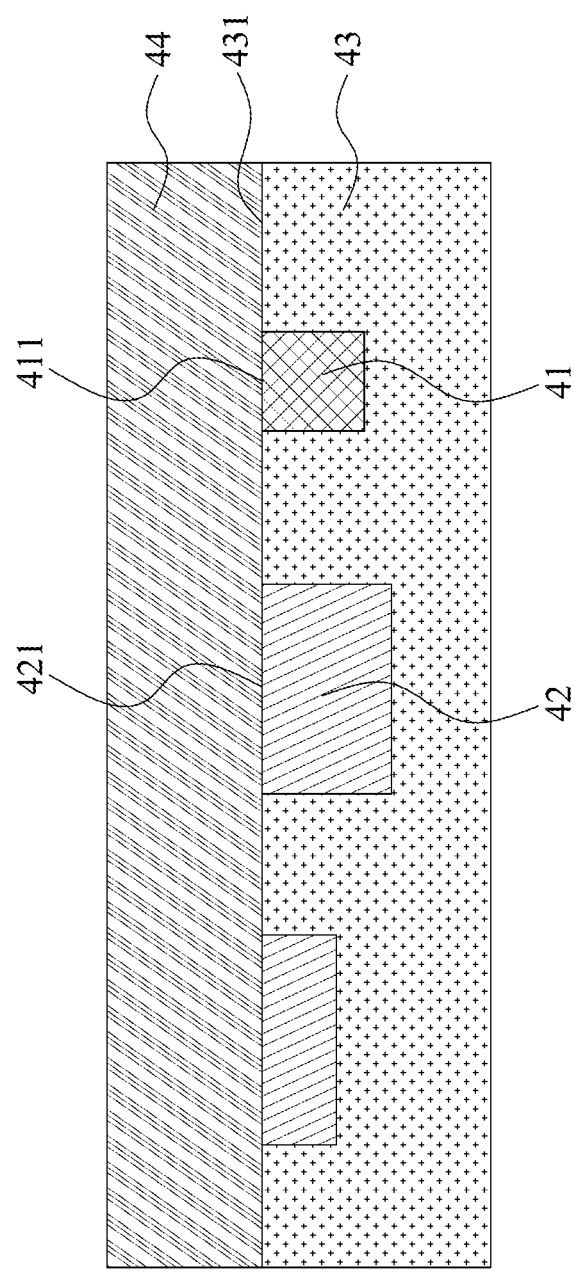
FIG. 4D illustrates one or more stages of a method of manufacturing an electronic module in accordance with some arrangements of the present disclosure.

Referring to FIG. 4D, a photoresist 44 may be disposed on the protection layer 43 to cover the planar surface 431. For example, the photoresist 44 may be in contact with the active surface 411 of the electronic component 41 and the active surface 421 of the electronic component 42.

Figure 4E:
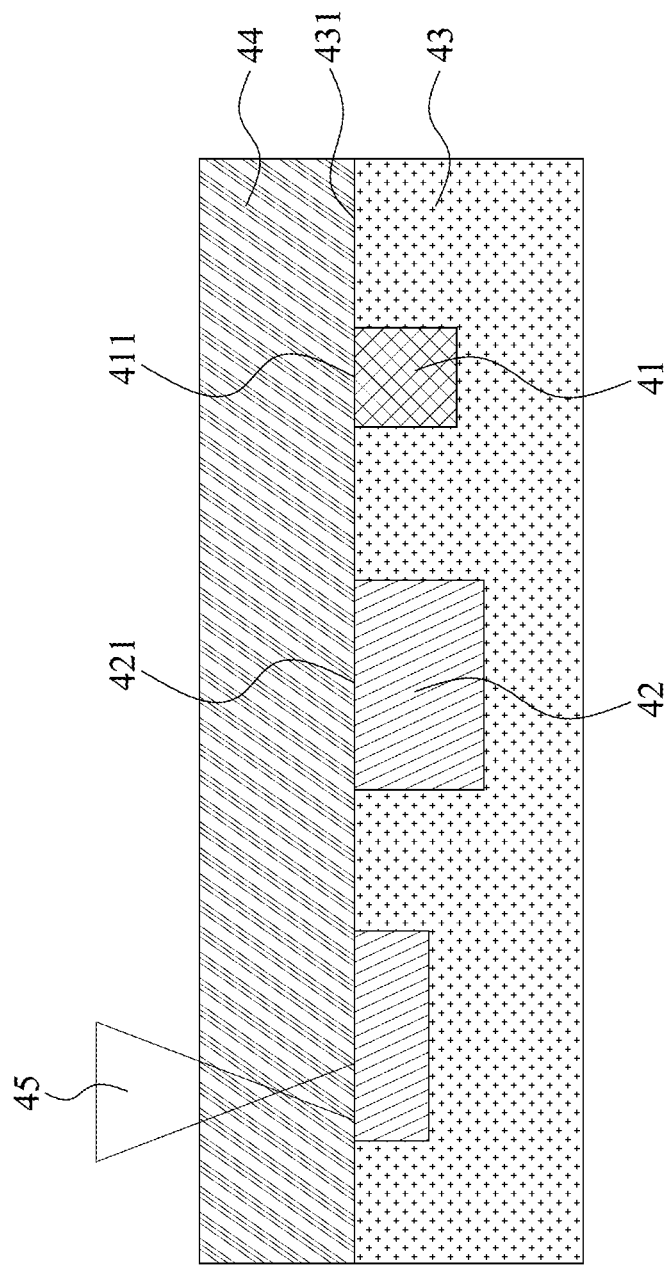
FIG. 4E illustrates one or more stages of a method of manufacturing an electronic module in accordance with some arrangements of the present disclosure.

Referring to FIG. 4E, one or more laser beams may be applied on the photoresist 44 to pattern the photoresist 44. In some arrangements, the laser beams 45 may be configured to form an optical path or a connection element (e.g., the connection elements 10*a* and 11*a* in FIG. 1 or the connection element 22 in FIG. 2A) via a three-dimensional microfabrication method. In some arrangements, the laser beams may be configured to focus on a predetermined location of an optical path or a connection element. For example, when focused into the volume of the photoresist 44, the laser beams may initiate two-photon polymerization via two-photon absorption and subsequent polymerization.

In some arrangements, the laser beams may be configured to adaptively route an optical path or a connection element between the electronic components 41 and 42. For example, a geometric relationship between the electronic component 41 and the electronic component 42 may be calculated, such as through a computer simulation for each module as it is manufactured. Then, an optical path or a connection element may be formed and adapted to the geometric relationship. For example, the shape of a connection element may be specifically-predetermined by the geometric relationship between the electronic component 41 and the electronic component 42.

Figure 4F:
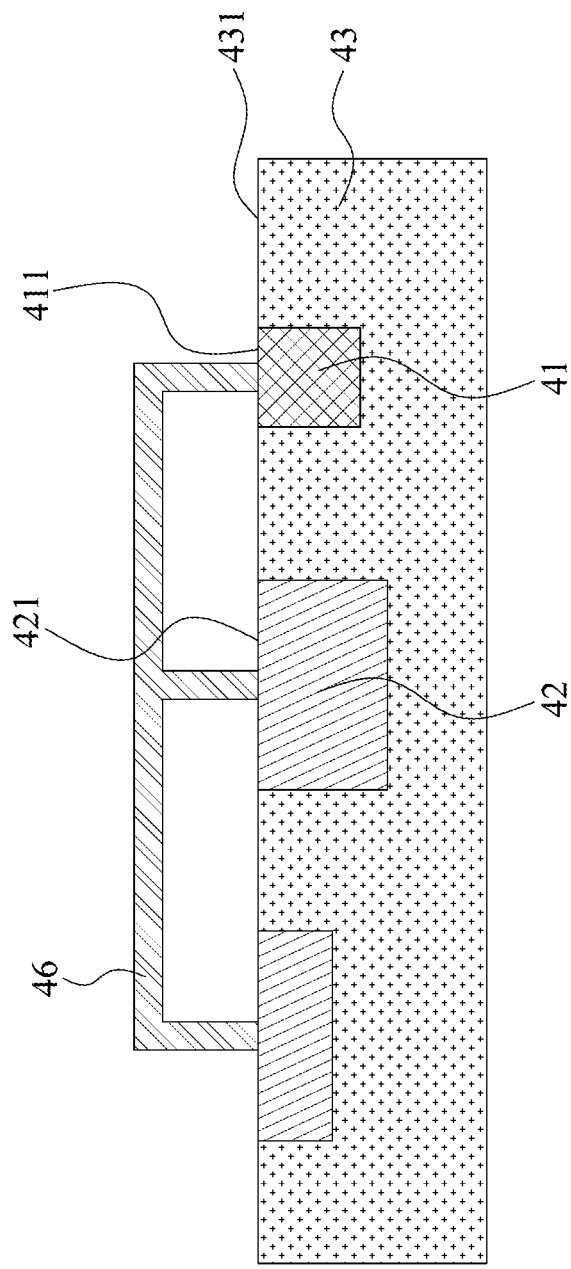
FIG. 4F illustrates one or more stages of a method of manufacturing an electronic module in accordance with some arrangements of the present disclosure.

Referring to FIG. 4F, a connection element 46 may be formed through the three-dimensional microfabrication method in FIG. 4E. In some arrangements, the connection element 46 may have a portion substantially parallel with the active surface 411 of the electronic component 41 and the active surface 421 of the electronic component 42. The distance and the relative direction between the connection element 46 and the surroundings (e.g., the electronic component 41 and the electronic component 42) should be well-controlled to meet a condition of total internal reflection and trap or confine light beams in the connection element 46. For example, the distance, the height, or the rising range of the connection element 46 from the protection layer 43 should be kept at a certain elevation. The condition of total internal reflection is also related to the refractive index of the connection element 46 and the refractive index of cladding (or air) of the connection element 46.

In some arrangements, planarizing or aligning the active surface 411 of the electronic component 41 and the active surface 421 of the electronic component 42 may facilitate alignment between the electronic component 41 and the electronic component 42, which have different thicknesses. In some arrangements, disposing the photoresist 44 on a substantially coplanar surface 431 may help control the geometric relationship between the electronic component 41 and the electronic component 42. Therefore, an adaptive auto-routed optical path or a connection element may be formed. In some arrangements, disposing the photoresist 44 on a substantially coplanar surface 431 may help reduce the length of the connection element 46 and minimize costs.

Figure 4G:
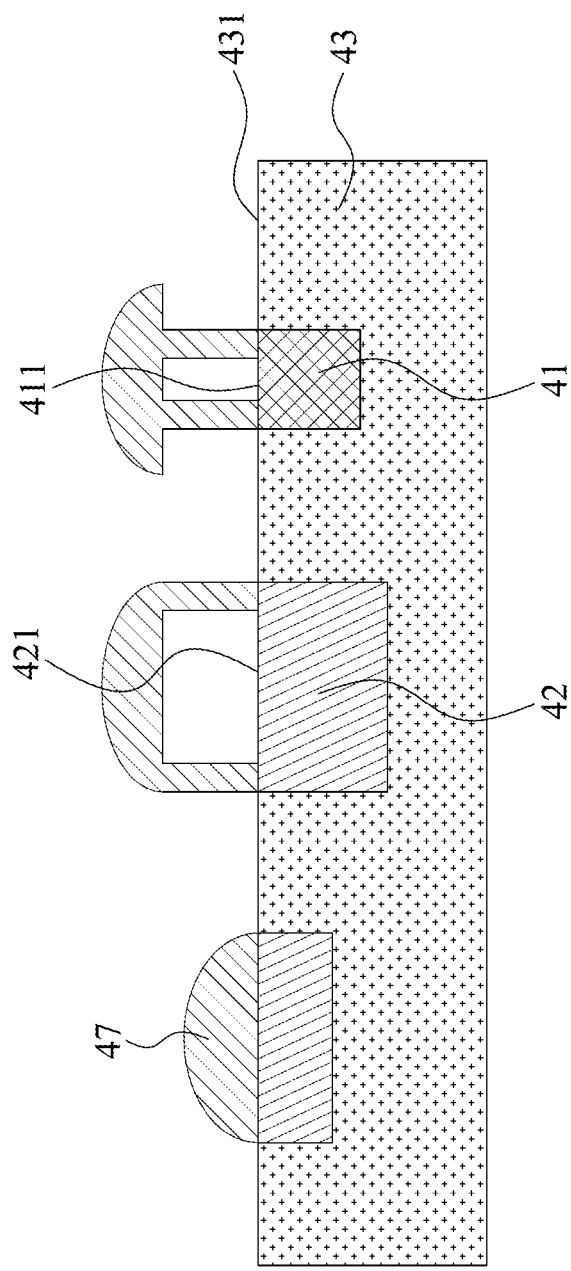
FIG. 4G illustrates one or more stages of a method of manufacturing an electronic module in accordance with some arrangements of the present disclosure.

In addition to the structure of FIG. 4F, another structure of FIG. 4G may be formed (in combination with the structure of FIG. 4F or alone) through the three-dimensional microfabrication method in FIG. 4E.

Referring to FIG. 4G, alternatively or additionally, a connection element 47 may be formed on the electronic component 41 and the electronic component 42. The connection element 47 may have openings for coupling light beams. A shape of a cross section of the connection element 47 may be designed to satisfy the connection requirements for the electronic component 41 and for the electronic component 42. For example, a shape of a cross section of the connection element 47 may be circular, semi-circular, rectangular, triangular, irregular, etc.

Spatially relative terms, such as "beneath," "below," "lower," "above," "upper," "left," "right" and the like, may be used herein for ease of description to describe one element or feature's relationship to another element(s) or feature(s) as illustrated in the figures. The spatially relative terms are intended to encompass different orientations of the device in use or operation, in addition to the orientation depicted in the figures. The apparatus may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. As used herein with respect to a given value or range, the term "about" generally means within ±10%, ±5%, ±1%, or ±0.5% of the given value or range. Ranges can be expressed herein as from one endpoint to another endpoint or between two endpoints. All ranges disclosed herein are inclusive of the endpoints unless specified otherwise. The term "substantially coplanar" can refer to two surfaces within micrometers (μm) of lying along the same plane, such as within 10 μm, within 5 μm, within 1 μm, or within 0.5 μm of lying along the same plane. When referring to numerical values or characteristics as "substantially" the same, the term can refer to the values lying within ±10%, ±5%, ±1%, or ±0.5% of an average of the values.

The foregoing outlines features of several arrangements and detailed aspects of the present disclosure. The arrangements described in the present disclosure may be readily used as a basis for designing or modifying other processes and structures for carrying out the same or similar purposes and/or achieving the same or similar advantages of the arrangements introduced herein. Such equivalent constructions do not depart from the spirit and scope of the present disclosure, and various changes, substitutions, and alterations may be made without departing from the spirit and scope of the present disclosure.

What is claimed is:

1. An electronic module, comprising:
a light source configured to emit a first light beam having a first wavelength in a first direction;
a converting device configured to receive the first light beam incoming in a second direction and to convert the first light beam to a second light beam having a second wavelength different from the first wavelength; and
a first connection element configured to transmit the first light beam from the light source to the converting device by internal reflection,
wherein the light source and the converting device non-overlap in the first direction and the second direction,
wherein a switch between the first direction and the second direction is defined by an angular change substantially equal to 180 degrees; and
wherein the first connection element comprises a ball-shaped optical structure optically coupled to the light source, a tapered portion contacting the converting device, and a curved trace part connecting the ball-shaped optical structure to the tapered portion, and the ball-shaped optical structure is spaced apart from the tapered portion by the curved trace part.

2. The electronic module of claim 1, wherein the ball-shaped optical structure and the tapered portion of the first connection element are adjacent to a first surface of a carrier and are separated from the first surface of the carrier by different vertical distances respectively.

3. The electronic module of claim 2, wherein the light source and the converting device are optically coupled to the ball-shaped optical structure and the tapered portion of the first connection element respectively, the tapered portion optically coupled to the converting device is separated from the first surface of the carrier by a first vertical distance, and the ball-shaped optical structure optically coupled to the light source is spaced apart from the first surface of the carrier by a second vertical distance greater than the first vertical distance.

4. The electronic module of claim 1, wherein the tapered portion tapers away from the ball-shaped optical structure.

5. The electronic module of claim 4, further comprising a carrier, wherein the tapered portion contacts a top surface of the carrier, and the ball-shaped optical structure is spaced apart from the top surface of the carrier.

6. The electronic module of claim 5, wherein the converting device is embedded in the carrier and having a top surface exposed by the top surface of the carrier and contacting the tapered portion.

7. The electronic module of claim 5, wherein the converting device has a top surface comprising a first portion contacting the tapered portion and a second portion exposed by the tapered portion.

8. The electronic module of claim 7, wherein the second portion of the top surface of the converting device comprises a recess recessed from the first portion of the top surface of the converting device and defined by an inclined surface substantially aligned with an inclined surface of the tapered portion.

9. The electronic module of claim 4, wherein the tapered portion is below the ball-shaped optical structure.

10. The electronic module of claim 1, further comprising:
a carrier, wherein the light source and the converting device are disposed on the carrier; and
a wire connecting an active surface of the light source to the carrier, wherein the tapered portion horizontally overlaps the wire.

11. The electronic module of claim 1, wherein the tapered portion is configured to reflect the first light beam from incoming in a third direction to transmitting to the converting device in the second direction, the third direction being different from the first direction and the second direction.

12. The electronic module of claim 1, wherein the tapered portion horizontally overlaps a portion of the curved trace part.

13. The electronic module of claim 1, further comprising:
a contact on an active surface of the light source; and
an adhesive structure connecting the ball-shaped optical structure to the contact.

14. The electronic module of claim 13, wherein the adhesive structure surrounds the contact.

15. The electronic module of claim 14, wherein the adhesive structure has a refractive index greater than a refractive index of a core material of the first connection element.

16. The electronic module of claim 1, further comprising a molding compound layer covering and contacting the light source and the converting device.

17. The electronic module of claim 16, wherein the light source and the converting device are embedded in the molding compound layer and have active surfaces exposed by and substantially coplanar with a top surface of the molding compound layer.

18. The electronic module of claim 17, wherein the first connection element defines a plurality of openings, and the active surfaces of the light source and the converting device are exposed to the openings.

19. The electronic module of claim 16, wherein the molding compound layer contacts a plurality of surfaces of the light source and a plurality of surfaces of the converting device.

20. The electronic module of claim 16, wherein an upper surface of the molding compound layer, an active surface of the light source, and an active surface of the converting device collectively define a continuous and substantially planar surface.

* * * * *